March 25, 1924.
P. W. PETERSEN
COMESTIBLE CONTAINER
Filed April 16, 1923
1,487,883
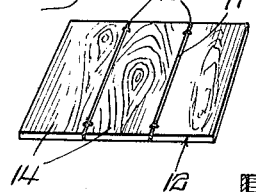
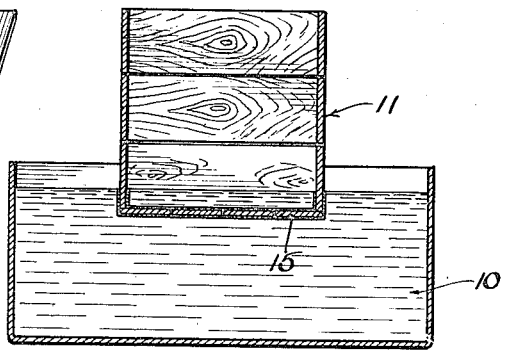
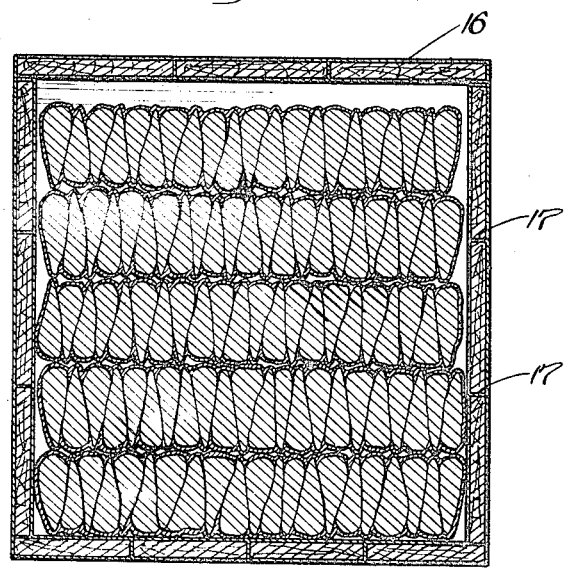

Patented Mar. 25, 1924.

1,487,883

UNITED STATES PATENT OFFICE.

PAUL W. PETERSEN, OF BAY CITY, MICHIGAN.

COMESTIBLE CONTAINER.

Application filed April 16, 1923. Serial No. 632,275.

*To all whom it may concern:*

Be it known that I, PAUL W. PETERSEN, a subject of the Kingdom of Denmark, residing at Bay City, in the county of Bay and State of Michigan, United States of America, have invented new and useful Improvements in Comestible Containers, of which the following is a full, clear, concise, and exact description, reference being had to the accompanying drawing, forming part of this specification.

My invention relates to a method of treating containers wherein comestibles are to be packed for cold storage.

An important object of my invention is to so treat the container that the wood or other material whereof it is constructed does not absorb or draw moisture from the comestibles therein during a reasonable term of storage.

Another object of my invention is to so treat the containers that when piled on trucks or one on top of another for storage, they slide easily one upon the other.

A still further object of my invention is to seal cracks in the various members of the container so as to hinder the free circulation of air through the container while the same is in use in cold storage.

It is at present the ordinary practice to pack comestibles such as fish which have been frozen, in wooden boxes, for cold storage. After the comestible so packed has been stored for a length of time it will be found that the surfaces of such comestibles packed directly adjacent to the walls of the box, more particularly perhaps the lid and the bottom, will be slightly faded or dried out. While the conditions prevailing in the cold storage room may be partly responsible for the drying and consequent fading of the comestibles stored, part of this drying out process is caused by the wood of the boxes which has the effect of drawing or absorbing moisture from the comestible.

The fading or drying out of the comestible detracts from the weight and the pleasing appearance thereof. It is therefore a commercial draw-back which has long been recognized by the trade, and various attempts to overcome this draw-back have been made. It is, for instance, now common practice to "glaze" the frozen fish with a coating of ice before they are packed in a wooden box. The "glazing" process comprises immersion of the frozen article in a bath of water whereby the water adjacent to the article freezes into a thin sheet of ice surrounding and enclosing the article. Comestibles such as fish are also often packed tightly in pans, or cans, so tightly that they freeze together in a solid cake, whereafter this cake is treated as a unit when glazed. Such cakes may be easily and conveniently packed in a rectangular box and the surfaces of the top and the bottom cakes are often placed directly adjacent to the lid and the bottom of the box. The shell of ice protects the enclosed comestible from evaporation during cold storage, as long as the shell of ice lasts. The coating of ice itself will evaporate after a time, and when it becomes fully evaporated at any particular portion of the comestible, that portion will be subject to the drying action, above mentioned, and a considerable loss of weight through evaporation will result during the remainder of the storage period.

Although "moisture" may not commonly be definable as including ice, the word "moisture" as used herein is intended to apply to and include ice inasmuch as ice can be evaporated and in the form of vapor can be "drawn out" of a comestible by contact with a wooden surface, the other side of which is refrigerated to a temperature below that of the ice in question. When comestibles which have been glazed, such for example as fish, are packed in a box, the detrimental developments referred to above will still take place, although to a slighter and slower degree than when the comestibles are unglazed. If the box is lined with paper or the comestibles inside the box have been wrapped in paper, the detrimental developments may be still further retarded and delayed, but not, however, entirely eliminated.

To the accomplishment of the foregoing objects and other objects that may hereinafter appear and in order to avoid the disadvantages previously experienced, I have designed a container and have perfected a method of treating such a container as hereinafter described and illustrated in the accompanying drawing, in which—

Figure 1 is a sectional view showing a container while being glazed by partial immersion in a bath of water;

Fig. 2 is a detail perspective view of a "box-shook," a number of which may be assembled together to form a box of the type used in carrying out my process;

Fig. 3 is a sectional view illustrating a storage container or box having its interior and exterior surfaces covered with a glazing of ice in accordance with my invention, a plurality of cakes of glazed frozen comestibles being shown packed therein.

Referring to Fig. 1, a tank or trough of water is indicated at 10 into which a container 11 may be wholly or partly immersed as desired. The container 11 may be made up of a number of "box-shooks" such as 12, each of which may form a side or end to the box. Each of the "box-shooks" 12 may be constructed in any well known manner, as by fixing together with brads 13 a number of slabs 14. The boxes may preferably be composed of a fibrous material, such for example as wood.

I have found that if the comestible container or box itself is glazed, or the particular parts or box-shooks 12 which in practice cause most of the detrimental development, such as the bottom 15 and the lid 16 are glazed, then the detrimental developments referred to above will not take place until such glazing has disappeared through evaporation. I have further found that wood as commonly used in cold storage boxes varies in the degree of moisture contained in the fibre. What I therefore do in practice is this: Before utilizing boxes for packing comestibles which are to be packed in a cold room for cold storage purposes, I cool the box itself, or certain members thereof, such as the box-shooks 12 to a degree sufficient to render the box or members thereof susceptible to glazing when immersed in cold water. The box is used for packing only after such glazing has taken place. If the wood gives evidences of being particularly dry before being stored, it may be soaked in water before it is cooled. During this preliminary cooling, a part of the moisture content of the wood may evaporate, but all of it need not be drawn off because the preliminary cooling need consume only a comparatively short time and the evaporation process can only be completed over a prolonged span of time.

I have found that in glazing a box or members thereof in this manner, it is convenient to glaze both the inside and outside surfaces. Such glazing of both surfaces will tend to still further retard the above described detrimental developments and will also provide the outside surfaces, or portions thereof, with an ice coating which will render the box easily slidable and will thus facilitate the handling thereof in cold storage. I have also found that such glazing stops up the crevices, or interstices, in the various members and also often the crevices 17 between the various members of a box to such extent as to exclude or hinder the free circulation of air through the box. In a great many cases I have found it to be advantageous to hinder the free circulation of air through individual boxes during cold storage.

It is evident that the boxes when glazed in the above indicated manner are provided with a coating of ice entirely independent of any glazing that may have been applied to the contents. The process comprising my invention should be distinguished from any processes whereby the box with the comestibles therein are together immersed in cold water and glazed as a unit, since by such processes the coating of ice may be irregular and practically no glazing occurs at the actual points of contact of the box with the fish and consequently some of the important advantages of my preferred process are absent. However, if desired, the boxes together with the comestibles therein may be glazed as a unit after, and in addition to the original independent glazing of the box or its contents, such additional glazing sometimes being advisable after the original glazing has become evaporated after storage for several months.

From the foregoing description, it will be obvious that I have provided a very simple, inexpensive and practical method of treating containers in which comestibles are packed for cold storage purposes, which method avoids disadvantages previously experienced with such containers.

While I have described my invention and certain specific embodiments thereof in detail, it is to be understood that modifications may be made thereto without departing from the spirit and scope of the appended claims.

Having thus described my invention, what I claim as new and desire to secure by Letters Patent in the United States, is:

1. A container for the storage of comestibles comprising a box, and a glazing of ice within said box upon surface areas thereof that are adapted to contact with the comestible.

2. A container for the storage of comestibles comprising a box, and a glazing of ice entirely covering the interior surfaces of said box.

3. A container for the storage of comestibles comprising a box having a glazing of firmly adhering ice covering the interior bottom surface thereof.

4. A container for the storage of comestibles comprising a box, and a glazing of ice covering the interior and exterior bottom surfaces thereof.

5. A container for the storage of comestibles comprising a box, and a glazing of ice covering the interior bottom and top surfaces thereof.

6. A container of the class described comprising a box composed of fibrous material, and a firmly adhering coating of ice upon surface areas thereof that are adapted to contact with the comestible.

7. A container of the class described comprising a wooden box having a glazing of ice covering the interior surfaces thereof.

8. A container for the storage of frozen comestibles comprising a wooden box, a firmly adhering glazing of ice covering the interior surfaces thereof for preventing direct contact of the comestible with the wood, and a firmly adhering glazing of ice covering the exterior container surfaces for sealing interstices, for checking evaporation of moisture through the walls and for facilitating conveyance of the containers by sliding.

9. The method of treating box-shooks which consists in first subjecting them to a freezing temperature, then immersing them in a bath of water, and then again subjecting them to a freezing temperature.

10. The method of treating box-shooks which consists in first immersing them in a bath of water, second, subjecting them to a freezing temperature until their temperature falls below 32° F., third, immersing them in a bath of water, and then subjecting them to a freezing temperature.

11. The method of treating a container for the storage of comestibles therein which comprises first lowering the temperature thereof to a point below 32° F. and second, immersing the empty container in a bath of water for a short period whereby a firmly adhering glazing of ice is imparted to the surfaces thereof.

12. The method of treating a container of fibrous material to be used for the storage of frozen comestibles which comprises first immersing the container in a bath of water for a sufficient period to saturate the fibre, second, subjecting the container to a freezing temperature, third, again immersing the container when empty in a bath of water, and then subjecting the container to a freezing temperature.

13. The method of storing frozen comestibles and maintaining a subnormal rate of moisture evaporation therefrom which comprises first packing the comestibles in a container interior surfaces of which are covered with a coating of ice, and then renewing the coating of ice at intervals by wetting at a low temperature the surfaces of the container and the comestibles packed therein.

14. The method of storing frozen comestibles and maintaining a subnormal rate of moisture evaporation therefrom which comprises first packing the comestibles in a container interior surfaces of which are covered with a coating of ice, and then renewing the coating of ice by wetting the surfaces of the container at a low temperature.

15. The method of storing frozen comestibles and reducing the rate of moisture evaporation therefrom, which comprises packing the comestibles in a container and lowering the temperature of the container to a point below 32 degrees F. and then immersing the container with the comestibles in a bath of cold water for a short period, whereby a glazing of ice is imparted to surfaces of the container and comestibles.

In witness whereof, I have hereunto subscribed my name.

PAUL W. PETERSEN.